United States Patent
Fakhri et al.

(10) Patent No.: US 8,204,285 B2
(45) Date of Patent: Jun. 19, 2012

(54) GENERALIZED 5D DYNAMIC AND SPECTRAL FACTOR ANALYSIS

(75) Inventors: Georges El Fakhri, Brookline, MA (US); Arkadiusz Sitek, Walnut Creek, CA (US)

(73) Assignee: The Brigham and Women's Hospital, Inc., Boston, MA (US)

( * ) Notice: Subject to any disclaimer, the term of this patent is extended or adjusted under 35 U.S.C. 154(b) by 949 days.

(21) Appl. No.: 11/916,568

(22) PCT Filed: Jun. 16, 2006

(86) PCT No.: PCT/US2006/023390
§ 371 (c)(1),
(2), (4) Date: Aug. 12, 2008

(87) PCT Pub. No.: WO2006/138506
PCT Pub. Date: Dec. 28, 2006

(65) Prior Publication Data
US 2008/0292165 A1     Nov. 27, 2008

Related U.S. Application Data

(60) Provisional application No. 60/691,656, filed on Jun. 17, 2005.

(51) Int. Cl.
*G06K 9/00* (2006.01)
(52) U.S. Cl. .................................................. 382/128
(58) Field of Classification Search ........... 382/100–154
See application file for complete search history.

(56) References Cited

U.S. PATENT DOCUMENTS

| | | | |
|---|---|---|---|
| 5,458,126 A | 10/1995 | Cline et al. | |
| 6,009,208 A | 12/1999 | Mitra et al. | |
| 6,464,640 B1 | 10/2002 | Guracar et al. | |
| 6,823,205 B1 * | 11/2004 | Jara | 600/410 |
| 6,917,199 B2 * | 7/2005 | Jara | 324/309 |
| 7,002,345 B2 * | 2/2006 | Jara | 324/310 |
| 2001/0043068 A1 | 11/2001 | Lee | |

* cited by examiner

*Primary Examiner* — Dixomara Vargas
(74) *Attorney, Agent, or Firm* — Fish & Richardson P.C.

(57) ABSTRACT

A method for processing image data includes representing the image data as a model having a spatial dimension, a time dimension, and an energy dimension; providing an objective function that is a function of energy factors, time factors, and image coefficients included in the model; and determining values of the energy factors, the time factors, and the image coefficients that minimize a difference between the optimal value of an objective function and a value of the objective function, the values of the energy factors, the time factors, and the image coefficients defining a solution.

20 Claims, 9 Drawing Sheets

GENERALIZED 5D DYNAMIC AND SPECTRAL FACTOR ANALYSIS

RELATED APPLICATIONS

This application is the U.S. national stage, under 35 USC 371, of International Application Number PCT/US2006/023390, filed Jun. 16, 2006, which claims the benefit of the priority date of U.S. Provisional Application No. 60/691,656, filed Jun. 17, 2005. The contents of these applications are incorporated herein by reference.

STATEMENT REGARDING FEDERALLY SPONSORED RESEARCH OR DEVELOPMENT

This invention was made with U.S. Government support under Grant No. EB005876, awarded by the National Institutes of Health. The Government has certain rights in this invention.

TECHNICAL FIELD

This invention relates to medical imaging, and more particularly to factor analysis.

BACKGROUND

Factor analysis is a powerful technique that decomposes a spectral or temporal image sequence into a small number of fundamental functions (factors) whose associated spatial distributions are called factor images. However, with factor analysis, unique solutions are not ensured. Several techniques have been developed that address this problem, in the time (dynamic studies) or energy (spectral studies) domains, to constrain the solution space and make the factor analysis approach more quantitative. Some of these techniques, in particular those based on the use of a priori physiological information, may be tailored for a particular type of clinical study. These techniques generally require modification when used in different settings. For example, a particular factor analysis approach that yields satisfactory results in studies of healthy people may not yield satisfactory results in studies of patients with different medical conditions or physiological disorders.

Some major challenges of factor analysis include improving the contrast and spatial resolution of images, estimating activity curves from noisy data, and reducing background noise contributed from emission scatter and crosstalk.

SUMMARY

In an aspect, the invention features methods and computer readable mediums for processing image data. The image data is represented as a model having a spatial dimension, a time dimension, and an energy dimension, and includes energy factors, time factors, and image coefficients defining spatial distributions of the energy and time factors. An objective function that is a function of the energy factors, the time factors, and the image coefficients is provided; and an optimal value for the objective function is selected (e.g., a minimum value of the objective function). Values of the energy factors, the time factors, and the image coefficients that minimize a difference between the optimal value and a value of the objective function are determined. For example, A gradient of the objective function is calculated and minimized iteratively until an absolute value of the gradient is less than a predetermined value (e.g., $10^{-6}$). The values of the energy factors, the time factors, and the image coefficients that are determined define a solution.

In some embodiments, the solution obtained may be unique. The solution may be constrained according to a priori knowledge associated with some of the energy and time factors (e.g., primary energy and time factors). For example, primary energy factors may be modeled as a Gaussian-shaped function centered at a characteristic emission energy of a desired tracer, and having a full-width at half-maximum equal to the product of energy resolution of a camera at the characteristic emission energy and the characteristic emission energy.

First and second tracers that are used for monitoring different physiological processes may be administered to a subject, and the image data may be generated based on detection of radiation emitted by the first and second tracers.

The objective function may include at least one penalty term that forces a condition on the solution based on a priori information when minimized. For example, minimizing the penalty term may include penalizing negative values of the time factors, energy factors, and image coefficients. Representing the image data as a model may include selecting at least one of the time factors to be a primary time factor; selecting at least one of the time factors to be a scatter time factor; selecting at least one of the energy factors to be a primary energy factor; and selecting at least one of the energy factors to be a scatter energy factor.

In a further aspect, the invention features a medical imaging system that includes a data collection system; and a data processing system in communication with the data collection system, the data processing system being configured to execute methods described herein. In some embodiments, the data collection system may include at least one of: a SPECT system, an MRI system, a CT system, a PET system, an ultrasound system, and a fluoroscopy system.

Advantages that can be seen in particular implementations of the invention include one or more of the following.

In some implementations, estimates of time factors and energy factors (collectively referred to as "factors") and factor images obtained with 5D-GFA are significantly more accurate and more robust to noise than activity curves estimates obtained using four-dimensional factor analysis. The effects of emission scatter and crosstalk can be reduced to yield factor images with higher contrast, improved resolution, and greater accuracy. Activity curves may be estimated from a variety of dynamic imaging applications. In some implementations, factor image estimates obtained using five-dimensional generalized factor analysis (5D-GFA) are more accurate and more robust to noise than factor image estimates obtained using conventional four-dimensional factor analysis.

Factors and factor images can be obtained from simultaneously imaging different tracers monitoring different physiological processes. Simultaneous imaging of different tracers ensures perfect registration of the two tracers under identical physiological conditions and reduces acquisition time. An analysis of factors and factor images obtained using simultaneous imaging may provide earlier and more accurate diagnoses of medical conditions.

The details of one or more embodiments of the invention are set forth in the accompanying drawings and the description below. Other features, objects, and advantages of the invention will be apparent from the description and drawings, and from the claims.

DETAILED DESCRIPTION

Five-dimensional generalized factor analysis (5D-GFA) uses a five-dimensional factor analysis model to represent acquired image data. The five dimensions are the three spatial dimensions that determine the coordinates (x, y, z) of a detected photon, the photon energy, and time. From the acquired image data, time factors, energy factors, and factor images are obtained. Time factors, also referred to as "time activity curves (TAC)," describe a physiological process as a function of time. Energy factors are the spectra associated with detected photons. Factor images are visual representations showing the spatial distribution of a physiological process within the body. Time and energy factors and factor images provide information that can be used by a skilled practitioner to diagnose, assess, and/or monitor a physiological condition and determine an appropriate course of treatment.

Figure 1:
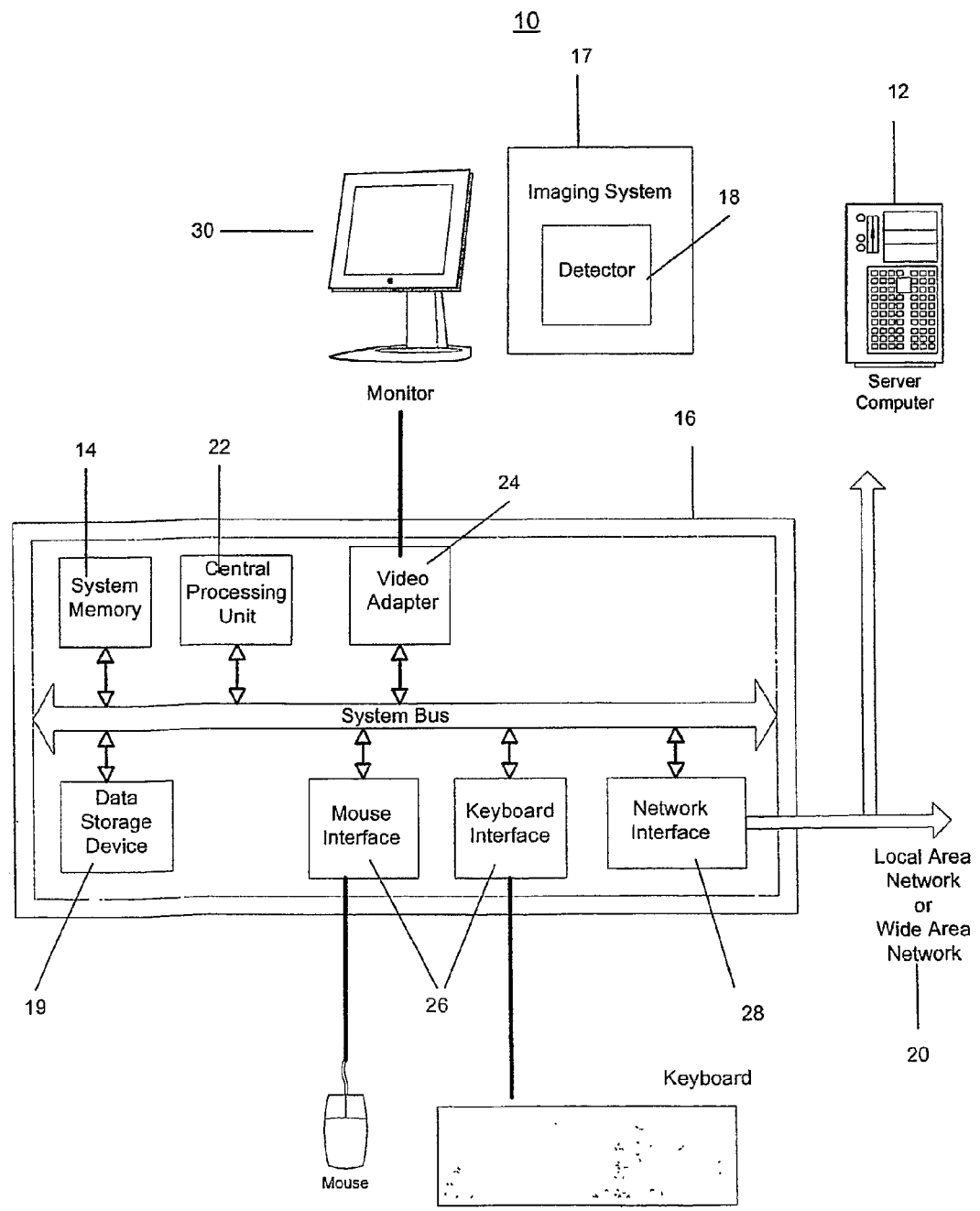
FIG. 1 shows a system for analyzing image data.

FIG. 1 shows an exemplary system 10 for analyzing image data using 5D-GFA. The system 10 includes a personal computer 16 for executing computer code; a monitor 30 for displaying data to a user; one or more input devices, such as keyboard and mouse, removable media 18 such as a floppy disk, CD-ROM, or other storage mechanism from which software is loaded into the personal computer 16; one or more server computers 12 for storing data collected from an imaging system 17; and a communications network 20 for sending data from the server computer 12 to the personal computer 16. In an exemplary embodiment, the imaging system 17 is connected to communications network 20 and configured to send data directly to the personal computer 16. Examples of an imaging system 17 include, but are not limited to, single photon emission computed tomography (SPECT) imaging systems, computed tomography (CT) imaging systems, magnetic resonance imaging (MRI) systems, fluoroscopy imaging systems, ultrasound imaging systems, and positron emission tomography (PET) imaging systems.

The personal computer 16 includes a data storage device 19, such as a hard drive, for storing data, system memory 14 for storing software, and a central processing unit 22 for executing the software stored in the system memory 14. The personal computer 16 also includes a video adapter 24 that interfaces the monitor 30, peripheral device interfaces, such as a mouse and keyboard interface 26, and a network interface 28.

In exemplary embodiments, the software supports a single user environment. For these embodiments, the communications network 20, the network interface 28, and the server computers 12 may be absent from the system 10. In other exemplary embodiments, the software supports multiple users collaborating on the development and use of activity curves-analysis techniques. In these embodiments, models and medical image data may be transmitted between multiple server computers 12 and personal computers 16 over a communications network 20. Examples of a communications network 20 include a local area network (LAN), a larger group of interconnected systems such as the internet, a private intranet, and other similar wired or wireless networks.

Some imaging techniques, such as SPECT, use tracers to monitor one or more physiological processes within a particular region of the body. A tracer typically includes a radioactive isotope that emits electromagnetic radiation having one or more characteristics energies. Some tracers, such as those typically used in SPECT imaging, emit gamma rays emissions having only a single characteristic energy. For example, tracers containing $^{99m}$Tc emit photons at 140 keV and tracers containing $^{123}$I, emit photons at 159 keV.

The imaging system 17 includes a detector 18 that detects the electromagnetic radiation emitted by the tracer as the tracer interacts with and moves through the patient's body. The detected radiation includes both "primary radiation" and "scatter radiation." Primary radiation refers to the portion of the emitted radiation that travels directly though the body to the detector 18 with no interactions. Scatter radiation refers to the portion of the emitted radiation that is scattered within the body or experiences cross-talk with radiation emitted by other traces before it reaches the detector 18. If the emission energies of two tracers are close (e.g., $^{99m}$Tc (140 keV) and $^{123}$I (159 keV) are within 20 keV of each other), scattered photons of one tracer are likely to be detected in the window of the other tracer. Furthermore, cross-talk occurs when primary photons emitted by one tracer are detected in the window of the other tracer, and vice-versa.

The imaging system 17 acquires image data based on the detection of the radiation by the detector 18. The acquired image data includes a "primary component" associated with the detection of primary radiation and a "scatter component" associated with the detection of scatter radiation. The energy factors and time factors derived from the primary component of the acquired data are referred to as "primary energy factors" and "primary time factors," respectively. Likewise, the energy factors and time factors derived from the scatter component of the acquired data are referred to as "scatter energy factors" and "scatter time factors," respectively.

The scatter component of the acquired data, when processed to form a factor image, contributes to the noise in the factor image. By reducing the contribution of the scatter component to the factor image, the overall quality of the factor image, including contrast, resolution, and accuracy, is improved. Because factor images are generally directly correlated with physiological processes, improving the overall quality of factor images also improves the accuracy of quantitative information derived from the factor images. Factor images showing the spatial distribution of primary time and energy factors are referred to as "primary factor images," and factor images showing the spatial distribution of scatter time and energy factors are referred to as "scatter factor images." In general, primary factor images provide an accurate visual representation of the processes of interest, while scatter factor images mostly show unwanted noise.

After collecting the image data, the imaging system 17 sends the data to the computer 16 for analysis over the network 20. In some embodiments, the computer 16 and imaging system 17 are integrated together.

Figure 2:
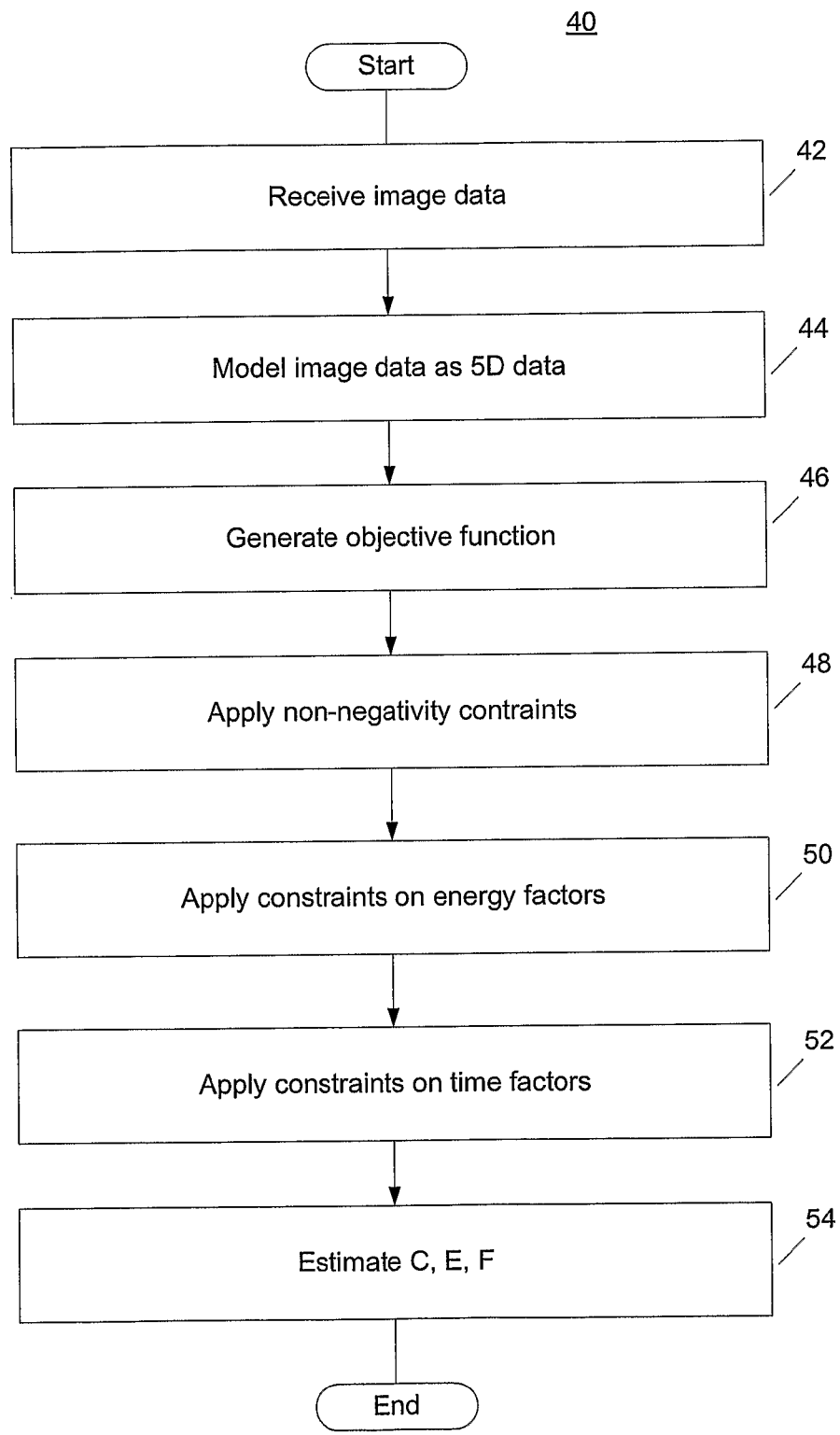
FIG. 2 shows a flow diagram of a five-dimensional generalized factor analysis process performed by the system shown in FIG. 1.

FIG. 2 shows a five-dimensional generalized factor analysis (5D-GFA) process 40 running on the computer 16 for analyzing image data obtained from the imaging system 17. The 5D-GFA process 40 receives the image data in the form of a dynamic sequence of medical images (step 42). The 5D-GFA process 40 models the acquired image data as five-dimensional data A et having three dimensions in space (i.e., x, y, z) denoted by index i, a dimension in time denoted by index t, and a dimension in energy denoted by index e (step 44). In particular, the index i corresponds to the three-dimensional spatial domain, i.e., the acquired projections (or reconstructed three-dimensional volume) of photons whose energy falls within energy bin e (defined as an energy interval, e.g., 5-keV wide) that are detected during time bin t (defined as a time interval per tomographic acquisition). The five-dimensional data $A_{iet}$ is expressed as the following equation:

$$A_{iet} = \sum_{q=p=1}^{Q,P} C_{iqp} E_{qe} F_{pt} + n, \quad \text{Eq. 1}$$

where $E_{qe}$ is the q-th energy factor at energy bin e stored in an energy factor matrix E having Q energy factors, and $F_{pt}$ is the p-th time factor at time bin t stored in a time factor matrix F having P time factors. The factor image coefficient $C_{iqp}$ couples the energy and time factors, $E_{qe}$ and $F_{pt}$, and corresponds to spatial distributions of the time and energy factors, $E_{qe}$ and $F_{pt}$, in the x-, y-, and z-directions. The factor image coefficient $C_{iqp}$ is stored in the factor image coefficient matrix C of size Q×P×3.

Some conventional factor analysis techniques model the acquired image data as four-dimensional data with three spatial dimensions and either a time or energy dimension. Such techniques are collectively referred to as "four-dimensional factor analysis," of which those that model image data in the spatial and energy domains are referred to as "four-dimensional spectral factor analysis (4D-SFA)," and those that model image data in the spatial and time domains are referred to as "four-dimensional factor analysis of dynamic sequences (4D-FADS)." In the absence of spectral information (no energy bins acquired), 5D-GFA becomes equivalent to 4D-FADS. Similarly, in the absence of dynamic information (acquisition of a static spectral study), 5D-GFA becomes equivalent to 4D-SFA.

The separation between dynamic and spectral studies in single photon emission computed tomography (SPECT) is artificial since any dynamic study contains both energy and time dimensions. For example, when acquiring dynamic frames following injection of a radiotracer, every time frame can be acquired in multiple energy bins (where each energy bin represents the detected photons with energies in the corresponding range) or in list-mode. In list-mode acquisition for each detected photon not only the position of the detection but also time, and energy are stored. Therefore, spectra can be plotted for each voxel of a given time frame. Traditionally, 4D-FADS is applied in the time domain to projections or reconstructed frames, assuming scatter has been corrected for, and aims at extracting time varying factors that have physiological meaning (e.g., dynamic renal or cardiac studies). Likewise, 4D-SFA is traditionally applied to projections at a given time frame and aims at compensating for Compton scatter by estimating the primary spectra and corresponding distributions.

As can be seen from Equation 1, representing the image data as a five dimensional model rather than as a four dimensional model increases the ratio of the number of equations to that of unknowns in the inverse problem to be solved, which in turn increases the likelihood of obtaining unique solutions for C, E, and F.

For example, given an image of N pixels, K=20 energy bins, T=20 time bins, considering Q=P=4 factors, and assuming K<<N and T<<N, the ratio of equations to unknown variables is K/Q=5 for 4D-SFA, and T/P=5 for 4D-FADS. Considering the 5D-GFA model of Equation 1, the ratio of equations to unknown variables is (K*T)/(Q*P)=25.

The 5D-GFA process 40 generates an objective function $f_{ob}(C,E,F)$ that includes a least-squares objective function $f_{LS}(C,E,F)$ (step 46):

$$f_{LS}(C, E, F) = \sum_{i,e,t}^{N,K,T} \left( \sum_{q=p=1}^{Q,P} C_{iqp} E_{qe} F_{pt} - A_{iet} \right)^2, \quad \text{Eq. 2}$$

where N is the number of pixels in the image, K is the number of energy bins, and T is the number of time frames. The 5D-GFA process 40 applies non-negativity constraints on C, E, and F by introducing a negativity penalty function $f_{nneg}(C,E,F)$ into the objective function that penalizes negative values of $C_{iqp}$, $E_{qe}$, and $F_{pt}$ (step 48). The objective function $f_{ob}(C,E,F)$ is given by the following equation:

$$f_{ob}(C,E,F) = f_{LS}(C,E,F) + bf_{nneg}(C,E,F), \quad \text{Eq. 3}$$

where the negativity penalty function $f_{nneg}(C,E,F)$ is define as:

$$f_{nneg}(C, E, F) = \sum_{i=q=p}^{N,P,Q} H(C_{i,q,p}) + \sum_{q=e=1}^{Q,K} H(E_{q,e}) + \sum_{p=t=1}^{P,T} H(F_{pt}), \quad \text{Eq. 4}$$

where the function H(x) is defined as:

$$H(x) = \begin{cases} x^2 & \text{for } x < 0 \\ 0 & \text{for } x \geq 0 \end{cases}. \quad \text{Eq. 5}$$

The negativity penalty function $f_{nneg}(C,E,F)$ is weighted by a penalty parameter, b, that adjusts the strength of the negativity penalty function. The penalty parameter b is chosen from a wide range of values ranging between 100000 and 1000000. When selected from this range, the value of the penalty parameter b is not critical for the convergence to a solution. In some embodiments, the penalty parameter b is 500,000 for normalized values of $A_{iet}$ that vary between 0 and 1.

The 5D-GFA process 40 applies constraints on some of the energy and time factors E and F based on a priori knowledge (steps 50 and 52).

In applying constraints on some of the energy factors E (step 50), the 5D-GFA process 40 models primary energy factors E as a Gaussian-shaped function centered at the characteristic emission energy of a desired tracer and having a FWHM (i.e., a full width at half of the maximum value) equal to the product of energy resolution of the camera at the characteristic emission energy and the characteristic emission energy. Energy resolution is generally expressed as a percentage representing the quotient of the FWHM energy by the characteristic emission energy (e.g., an energy resolution of 9.2% at 140 keV characteristic emission energy).

For example, the energy spectrum of primary (unscattered) photons emitted at 140 keV that are detected using a gamma camera with a NaI(T1) crystal with an energy resolution of 10% are known to be negligible for energies below 110 keV or above 170 keV. As follows, the primary energy factors corresponding to the primary 140 keV photons can be modeled by a function that is similar to a Gaussian function centered on 140 keV with a FWHM equal to 10% that goes to zero below 110 keV or above 170 keV. Since the spectra of scatter radiation are not know a priori, no constraint was imposed on the shape of the scatter energy factors.

In applying the constraints on F (step 52), the 5D-GFA process 40 adds an additional penalty term to the objective function that penalizes the primary time factors F in the objective function associated with tracers that are known to be stable (i.e., constant in time except for radioactive decay). For example, the $^{99m}$Tc-HMPAO tracer is stable in the brain after an uptake period of approximately 20 minutes. The 5D-GFA process 40 also initializes some of the time factor curves to a decaying mono-exponential function with a half-life equal to the half-life of the tracers associated with those factor curves (e.g., 6.02 hours for $^{99m}$Tc). No constraints are applied to time factors for which no a priori information is available.

The 5D-GFA process 40 then estimates the factor image matrix C, the energy factor matrix E, and the time factor matrix F that minimize the objective function $f_{ob}(C,E,F)$ shown above in Equation 3 (step 54).

Figure 3:
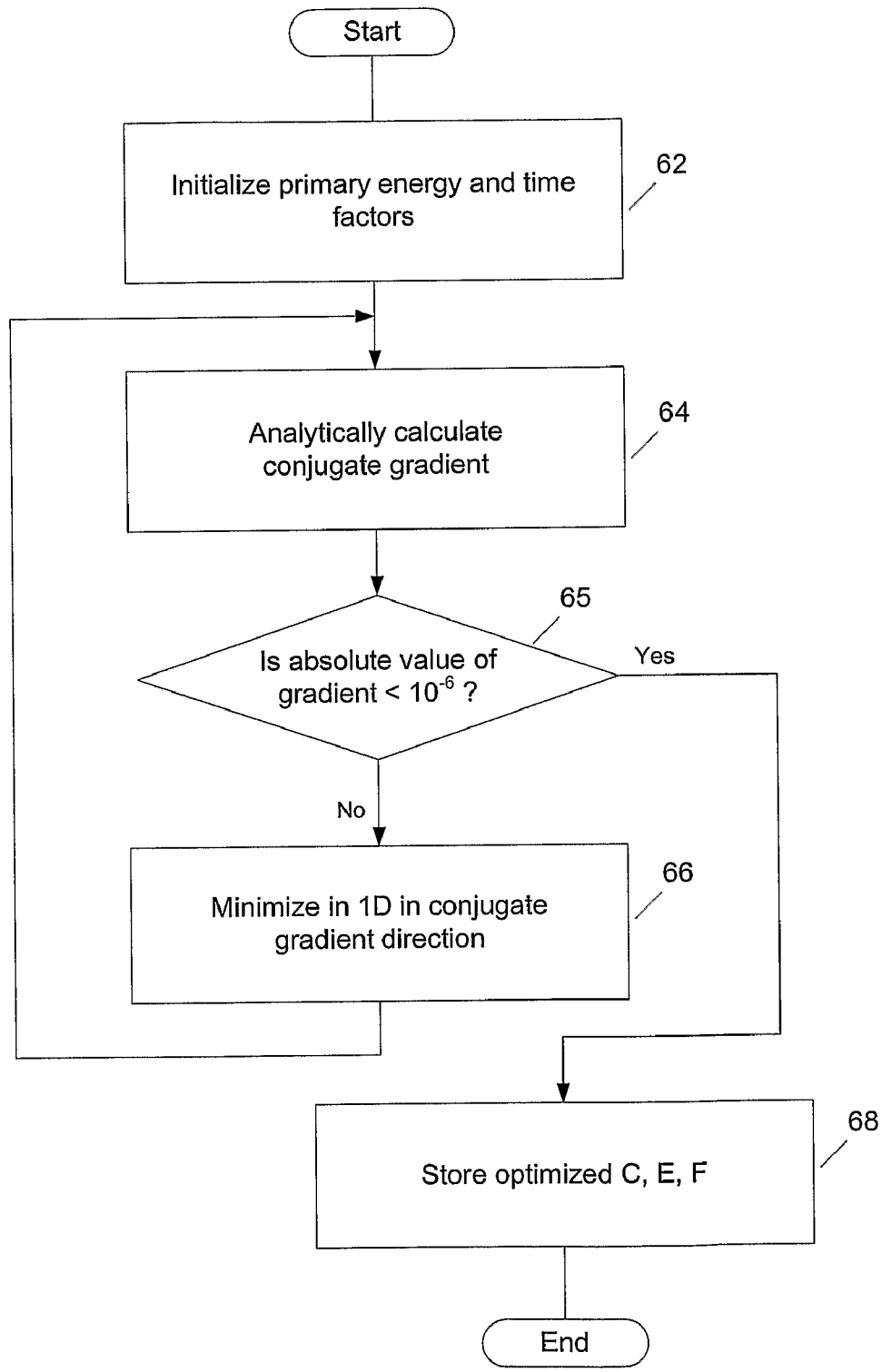
FIG. 3 shows a flow diagram of a minimization process performed by the system shown in FIG. 1.

Referring to FIG. 3, an estimation process 54 for estimating C, E, and F by minimizing the objective function $f_{ob}(C,E,F)$ is shown in further detail. When performing the minimization, the estimation process 54 applies the constraints on the time and energy factors F and E as follows. The process initializes the primary time and energy factors F and E with desired values (step 62) derived from a priori information so that the constrained curves remained unchanged during optimization as the direction of the domain change proceeds along the gradient. In some embodiments, the estimation process 54 initializes some of the image coefficients of matrix variable C according to a priori information.

The estimation process 54 then calculates the conjugate gradient of the objective function, $\nabla f_{ob}(C,E,F)$ using analytical methods (step 64). For example, the derivative of the least-squares term $f_{LS}(C,E,F)$ of $f_{ob}(C,E,F)$ with respect to the image matrix variable C can be expressed as:

$$\frac{\partial \left\{ \sum_{i,\theta,t}^{N,K,T} \left( \sum_{q=p=1}^{Q,P} C_{iqp} E_{q\theta} F_{pt} - A_{i\theta t} \right)^2 \right\}}{\partial C_{\gamma\varepsilon\tau}} = \qquad \text{Eq. 6}$$

$$2 \sum_{\theta=t=1}^{K,T} \left( \sum_{q=p=1}^{Q,P} C_{\gamma qp} E_{q\theta} F_{pt} - A_{\gamma \theta t} \right) E_{\varepsilon e} F_{\tau l}.$$

Similarly, the derivative of the least-squares term $f_{LS}(C,E,F)$ of the objective function $f_{ob}(C,E,F)$ with respect to variables E and F was calculated to obtain the whole gradient. For example, the derivative of $f_{LS}(C,E,F)$ with respect to F is:

$$\frac{\partial f(C,E,F)}{\partial F_{\pi\tau}} = 2 \sum_{i=\theta=1}^{N,K} \left( \sum_{q=1}^{Q} C_{kq\pi} E_{q\theta} F_{\pi\tau} - A_{i\theta\tau} \right) \sum_{q=1}^{Q} C_{iq\pi} E_{qc}, \qquad \text{Eq. 7}$$

and the derivative of $f_{LS}(C,E,F)$ with respect to E is:

$$\frac{\partial f(C,E,F)}{\partial E_{\theta\varepsilon}} = 2 \sum_{i=t=1}^{N,T} \left( \sum_{q=p=1}^{Q,P} C_{iqp} E_{q\varepsilon} F_{pt} - A_{i\varepsilon t} \right) \sum_{p=1}^{P} C_{i\varepsilon p} F_{pt}. \qquad \text{Eq. 8}$$

Calculating the gradient analytically increases the accuracy and speed of the estimation (step 52 in FIG. 2). Next, the ID minimization is performed along the conjugate gradient direction (step 66). Calculation of the gradient and minimization is repeated iteratively until the absolute value of the gradient is determined to be less than a predetermined value (e.g., less than $10^{-6}$) (step 65). The values of C, E, F for which the gradient is determined to be less than $10^{-6}$, are the optimal values of C, E, F and are stored as the solution (step 68).

When calculating the gradient, at every iteration of the conjugate gradient algorithm, the estimation process 54 sets the gradient for the factors initialized in step 62 to zero. Since the calculation of solutions for C, E, and F is driven by the gradient, the constrained time and energy factors remain unchanged during the calculation. In some embodiments, in addition to initializing some of the factors E and F (step 62), the estimation process 54 initializes appropriate factor image coefficients C to values known a priori and sets the gradient for these coefficients to zero at each iteration of the conjugate gradient algorithm.

Since the factors associated with the 5D-GFA are defined in time (time activity curves) or energy (spectra), the solution yields the energy factors corresponding to the scatter-free photon distributions of the isotope(s) considered, along with the time behavior of the tracer(s). Therefore, scatter correction and dynamic analysis can be performed simultaneously. Major applications of this approach involves simultaneous imaging of different tracers (e.g., $^{99m}$Tc/$^{123}$I) for monitoring different physiological processes (e.g., perfusion and neurotransmission in a pre-/post-synaptic dopaminergic system). In such applications, scatter and cross-talk compensation provide accurate quantitation of physiological parameters, and dynamic analysis of time factors enables the assessment of the physiological features involved in the processes being monitored (e.g., dopamine transporter/receptor density).

For example, simultaneous $^{123}$I/$^{99m}$Tc imaging has potential clinical applications in the simultaneous assessment of neurotransmission and brain perfusion. $^{123}$I tracers enable imaging of both pre-synaptic (e.g., β-CIT, altropane) and postsynaptic (e.g., IBZM, IBF) phases of dopaminergic transmission and have potential clinical utility in various movement disorders including Parkinson's disease, Huntington's disease, progressive supranuclear palsy, multiple system atrophy and Wilson's disease. $^{99m}$Tc tracers (e.g., HMPAO or ECD) enable the assessment of brain perfusion. Furthermore, simultaneous $^{123}$I/$^{99m}$Tc imaging ensures perfect registration of the two tracers under identical physiological conditions and reduces acquisition time. Reducing acquisition time is especially useful when imaging patients having movement disorders, as those patients have difficulty remaining still. Despite these advantages, techniques that simultaneously image different tracers are uncommon in practice due to the difficulty in correcting for scatter and cross-talk of emissions from the different tracers.

EXAMPLES

Dynamic Pre-/Post-Synaptic Striatal Phantom Studies

The performance of the 5D-GFA process 40 (FIG. 2) was evaluated in phantom studies involving simultaneous pre- and post-synaptic dynamic imaging using $^{99m}$Tc-DAT and $^{123}$I-IBF tracers. In an idiopathic Parkinson study, a striatal phantom (provided by Radiology Support Devices, Long Beach, Calif.), provided a realistic model of brain having unilateral severe reduction of DAT transporter ($^{99m}$Tc) in the left striata and bilateral preservation of dopamine receptors ($^{123}$I) with up-regulation in the caudate nucleus. The striatal phantom included a left and right caudate nucleus (volumes of 5 ml and 5.5 ml, respectively) and putamen (6.25 ml and 8 ml) that were each structured to be filled separately, a brain compartment (1,350 ml) and realistic cranial bone.

Figure 4:
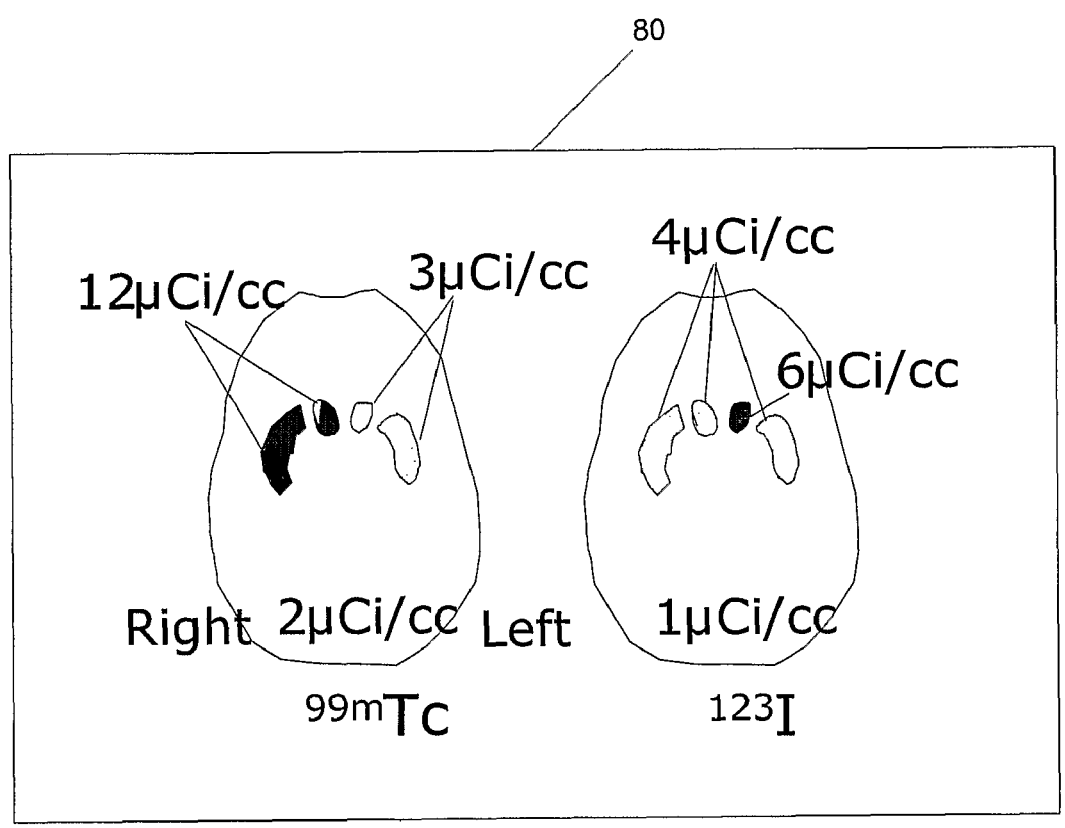
FIG. 4 shows a diagram of a straital phantom used for evaluating the performance of five-dimensional generalized factor analysis.

FIG. 4 shows a diagram 80 of the striatal phantom and the activity concentrations in μCi/cc used in the phantom. The $^{99m}$Tc-striata-to-background ratio (SBR) was 6:1 (or simply 6) in the right and 1.5:1 in the left caudate nucleus and putamen. $^{123}$I-SBR was 4:1 in the right caudate nucleus and putamen and in the left putamen and 6:1 in the left caudate nucleus. A point source of $^{99m}$Tc was positioned outside the brain and used to assess spatial resolution at the center of the brain and the quality of the scatter and cross-talk corrections. A perfect correction for scatter and cross talk would yield no activity at the location of the point source in the $^{123}$I window.

Dynamic data were acquired in listmode by scanning the phantom over thirteen hours using a triple-head TRIAD-XLT camera (provided by Trionix Inc., Twinsburg, Ohio) equipped with LEUHR collimators. In this approach, radioactive decay of $^{99m}$Tc and $^{123}$I was used to mimic time activity curves (TAC) in a neurotransmitter/neuroreceptor study. The $^{99m}$Tc and $^{123}$I activities in the striata decayed at different rates over time as they would in a true dynamic dopamine transporter/receptor study in primates where the $^{99m}$Tc-DAT and the $^{123}$I-D2 receptor have different kinetics and hence display different time behavior. Therefore, in this experiment, the true dynamic factors for $^{99m}$Tc and $^{123}$I are decreasing mono-exponentials with a half-life $T_{1/2}$ of 6.02 and 13.27 hours. The energy factors are the primary and scatter spectra associated with $^{99m}$Tc and $^{123}$I. Twenty-six 30-minute listmode acquisitions were performed (with each head rotating 120° for each acquisition) over 13 hours and rebinned into twenty-six frame-mode acquisitions of 30 minutes each. Each time frame consisted of 120 projections (128×128 pixels of 1.4 mm pixel size) covering 360° with each projection including twenty-one 5-keV energy windows spanning a range of 86 to 191 keV. Next, each of the twenty-one energy windows of every projection acquired in every time frame was reconstructed individually using an ordered subsets expectation maximization (OSEM) algorithm with four iterations and ten subsets. Primary $^{99m}$Tc and $^{123}$I energy factors were constrained to be Gaussian-shaped functions, centered on 140 keV and 159 keV, respectively, with a FWHM equal to the known intrinsic energy resolution of the gamma camera as described above with respect to FIG. 2, step 50. $^{123}$I time factors were constrained to be decaying mono-exponentials.

The 5D-GFA process 40 (FIG. 2) was applied to the acquired image data. A priori knowledge about some of the factor curves was included in the optimization process as follows: primary (non scattered) $^{99m}$Tc and $^{123}$I factors were constrained to be Gaussian-shaped functions, centered on 140 and 159 keV, respectively, with a FWHM equal to that of the gamma camera at 140 keV (9.2%) and 159 keV (8.6%). Furthermore, the primary $^{99m}$Tc factor was set to zero below 110 keV and above 170 keV and the primary $^{123}$I factor was set to zero below 126 keV. Both time and energy a priori constraints were incorporated into the minimization process by initializing the factor curves to the desired shapes and then by setting the gradient for a given factor to zero for each iteration of the conjugate gradient algorithm.

The results obtained with 5D-GFA were compared to results obtained using four-dimensional factor analysis approaches that were applied to the dynamic data after correcting the projections for scatter using a Compton energy subtraction window for each of the $^{99m}$Tc and $^{123}$I photopeaks having respective Compton windows of 90 to 122 keV and 110 to 142 keV. Time factors and image coefficients were determined using (1) conventional 4D-FADS and (2) a conventional volume-of-interest (VOI) analysis in which a skilled operator defined a VOI over a three dimensional volume obtained from several frames of medical images and estimated the counts within the VOI to generate the time factors. In this particular study, the VOI analysis defined VOI of the striata and background in the reconstructed images to estimate the corresponding time factors. The error associated with the estimation of the $^{99m}$Tc and $^{123}$I time factors was estimated by computing the normalized difference between the average counts detected in the striata over time within a VOI using VOI analysis and the true counts expected in the same volume as a function of time. The error in each of the time factors obtained using 5D-GFA or 4D-FADS was calculated as the difference between the activity curves obtained from a corresponding time factor and the true reference curve. For each time activity curve, a bias was estimated as the mean error over all time points and a standard deviation was estimated as the square root of the variance of the error over the time points.

Figure 5:
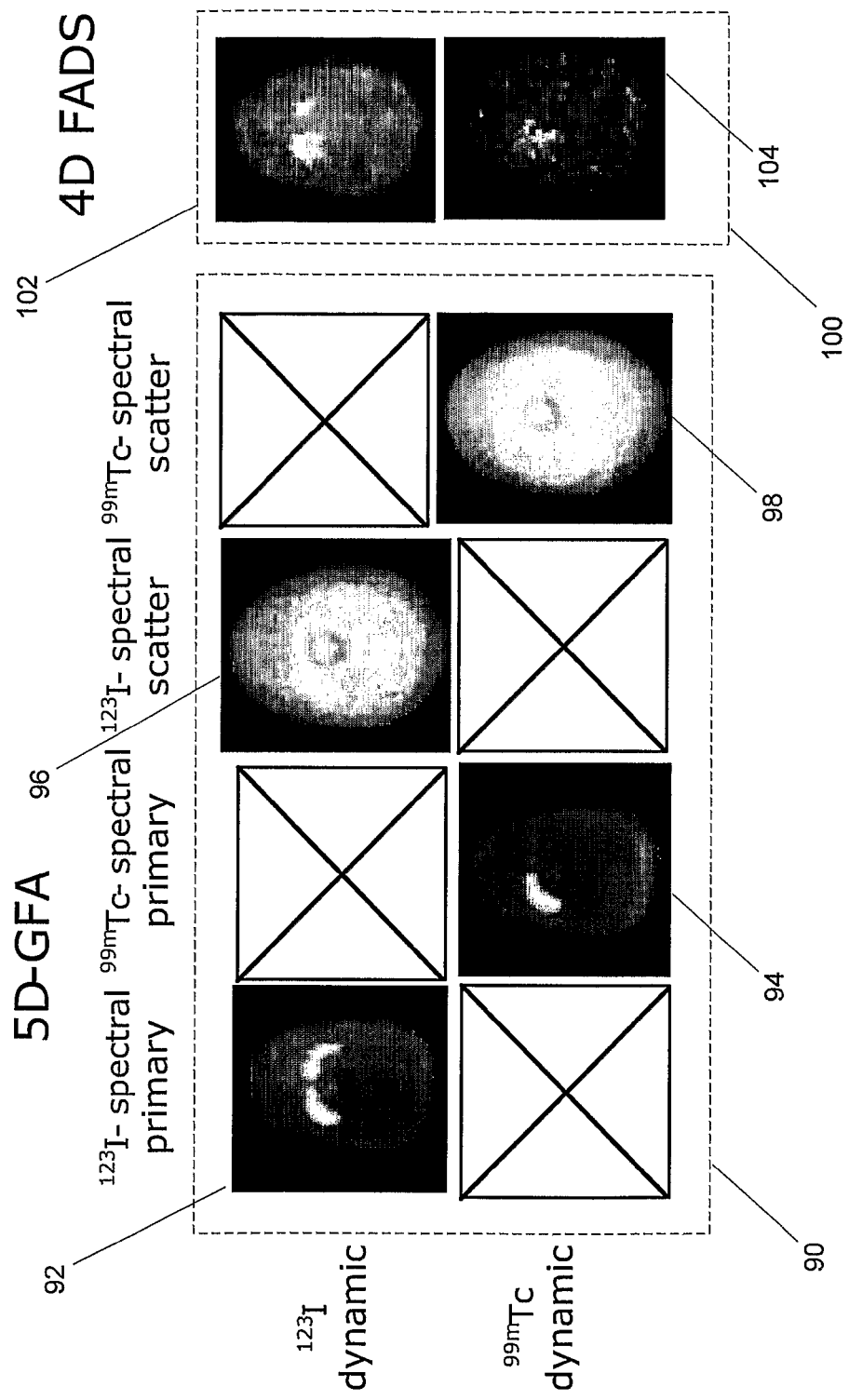
FIG. 5 shows factor images obtained from the straital phantom of FIG. 4.

FIG. 5 shows $^{99m}$Tc and $^{123}$I factor image sets 90 and 100 obtained using 5D-GFA and 4D-FADS, respectively. The 5D-GFA generated eight factor images, four of which were associated with factors that were a priori set to zero (show as crossed images). Of the non-zero factor images obtained using 5D-GFA, a first primary factor image 92 located in the first column shows the spatial distribution of the primary time and energy factors associated with the $^{123}$I tracer; a second primary factor image 94 located in the second column shows the spatial distributions of the primary time and energy factors associated with the $^{99m}$Tc tracer; a first scatter factor image 96 located in the third column shows the spatial distributions of the scatter time and energy factors associated with the $^{123}$I tracer; and a second scatter factor image 98 located in the fourth column shows the spatial distributions of the scatter time and energy factors associated with the $^{99m}$Tc tracer.

The factor image set 100 obtained with 4D-FADS includes a first factor image 102 showing the spatial distribution of time factors associated with the $^{123}$I tracer and a second factor image 104 showing the spatial distribution of time factors associated with the $^{99m}$Tc tracer.

Improvement in signal-to-noise ratio with 5D-GFA compared to 4D-FADS is evident for both $^{99m}$Tc and $^{123}$I images. The $^{99m}$Tc—SBR estimates of the factor images obtained with 5D-GFA are 4.8 in the right and 1.4 in the left striata, respectively, and are larger than the corresponding $^{99m}$Tc—SBR estimates of 4.1 and 1.3 obtained with 4D-FADS. The $^{99m}$Tc—SBR estimates obtained with 5D-GFA are less than the true $^{99m}$Tc—SBR values of the phantom which are 6 and 1.5 for right and left striata, respectively. This underestimation results from partial volume effects, evident from the ratio of the SBR estimates of the left to right striata with 5D-GFA being within 8% of the true ratio. The $^{123}$I-SBR estimates of 3.3 in both the right striata and left putamen, and 4.1 in the left caudate nucleus of the factor images obtained with 5D-GFA are larger than the corresponding $^{123}$I-SBR estimates of 1.6 and 3.5 obtained with 4D-FADS.

Figure 6:
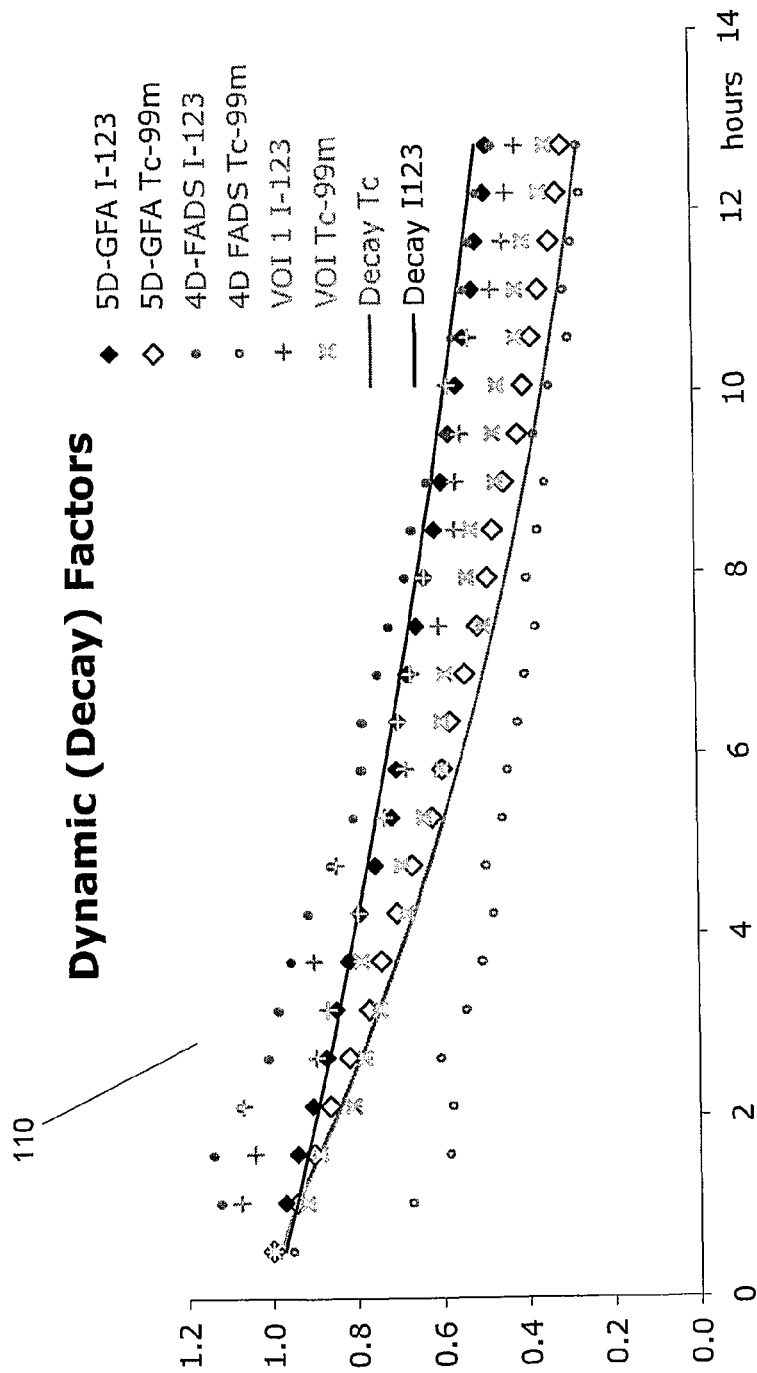
FIG. 6 shows a plot of time factors obtained from the straital phantom of FIG. 4.

FIG. 6 shows a plot 110 of the time factors estimated with 5D-GFA and 4D-FADS, as well as the known decay curves for $^{99m}$Tc and $^{123}$I. Time factors obtained from volumes of interest drawn over the striata using VOI analysis are also shown for $^{99m}$Tc and $^{123}$I. The bias and standard deviation of estimated time factors from the true $^{123}$I time factor were smaller for time factors estimated with 5D-GFA (−1.7±6.9%) compared to time factors estimated with FADS (8.3±12.7%) (p<0.05) and with VOI analysis (−5.4±9.3%). Likewise, the bias and standard deviation of estimated time factors from the true $^{99m}$Tc dynamic factor were smaller for time factors estimated with 5D-GFA (6.4±4.3%) compared to time factors estimated with 4D-FADS (15.5±10.6%)(p<0.05) and with VOI analysis (9.8±7.9%). The estimated decay half life for $^{123}$I ($T_{1/2}$=13.27 hours) was 13.10 hours with 5D-GFA, 10.6 hours with 4D-FADS and 13.4 hours with VOI analysis. The estimated decay half life for $^{99m}$Tc ($T_{1/2}$=6.02 hours) was 6.7 hours with 5D-GFA, 9.1 hours with 4D-FADS, and 9.8 hours with VOI analysis.

Figure 7:
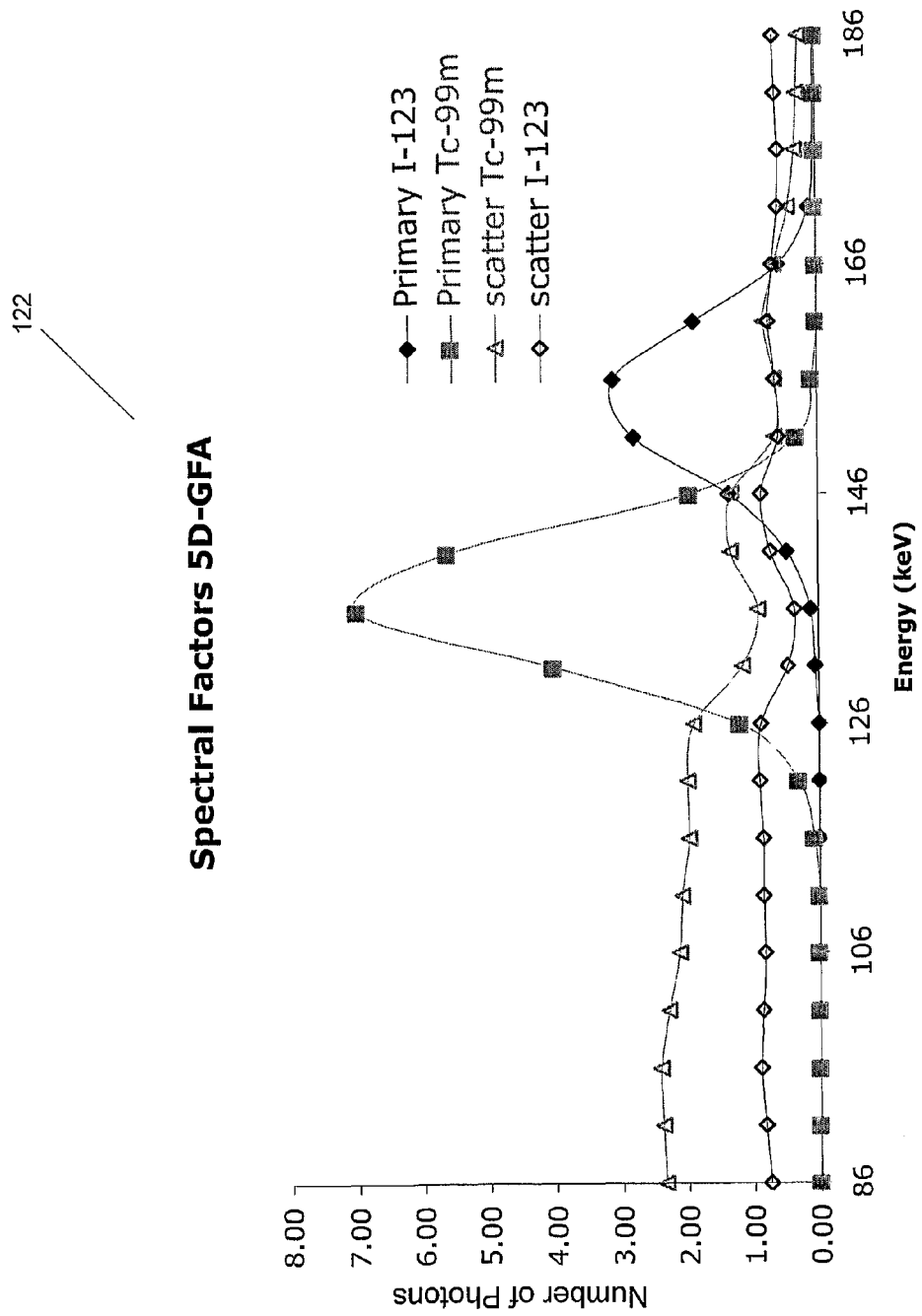
FIG. 7 shows a plot of energy factors obtained from the straital phantom of FIG. 4.

FIG. 7 shows a plot 120 of the primary and scatter $^{99m}$Tc and $^{123}$I energy factors estimated with 5D-GFA. The four energy factors shown in the plot 120 were estimated simultaneously with the two $^{99m}$Tc and $^{123}$I time factors shown in FIG. 7.

Figure 8:
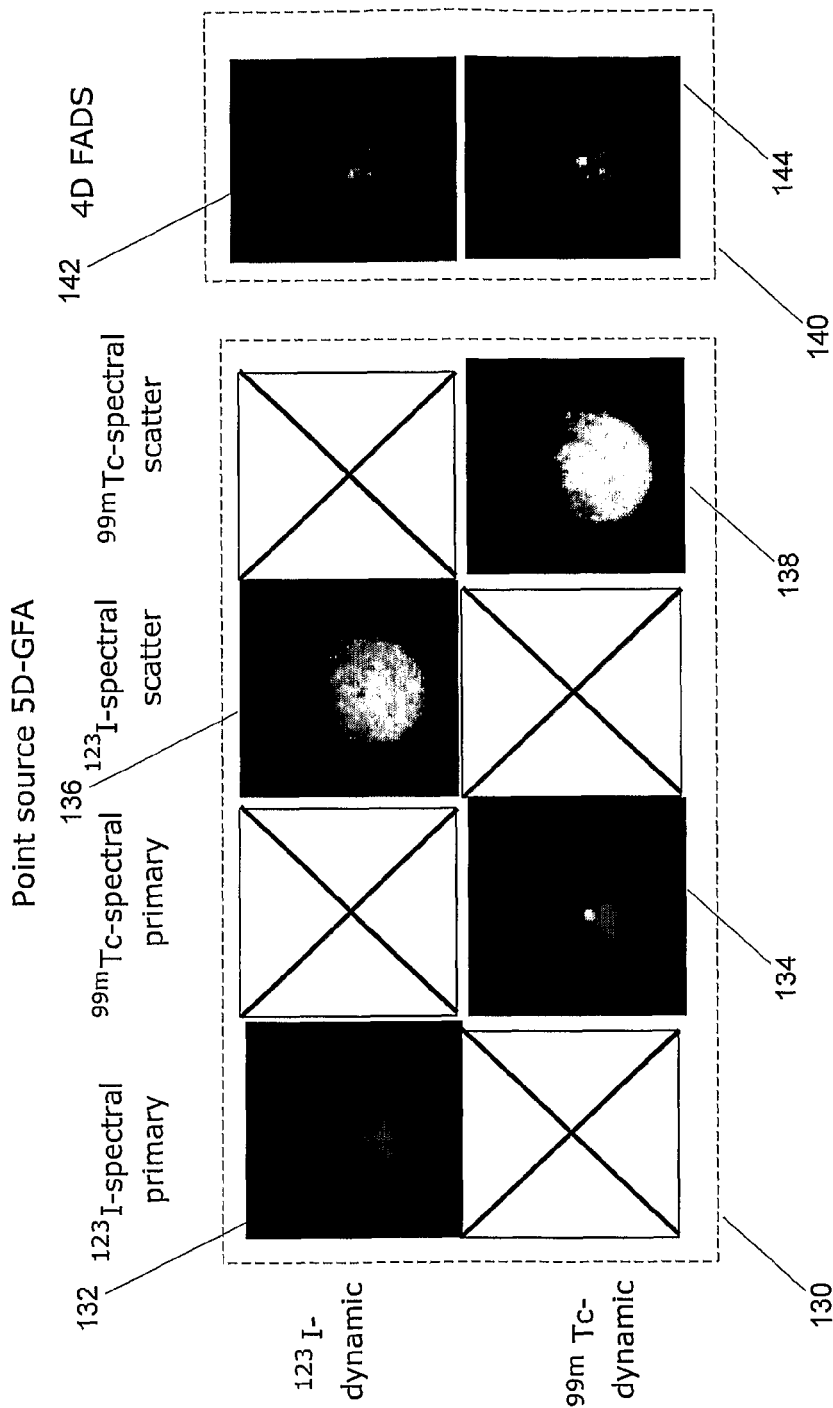
FIG. 8 shows factor images of a point source.

FIG. 8 shows $^{99m}$Tc and $^{123}$ factor image sets 130 and 140 for the $^{99m}$Tc point source positioned at the base of the brain obtained using 5D-GFA and 4D-FADS, respectively. The crossed images indicate images of the factors that a priori set to zero. The factor image set 130 obtained using 5D-GFA includes primary factor images 132 and 134 located in the first two columns and scatter factor images 136 and 138 located in the third and fourth columns. The factor image set 140 obtained using 4D-FADS includes a first factor image 142 showing the spatial distribution of time factors associated with the $^{123}$I tracer and a second factor image 144 showing the spatial distribution of time factors associated with the $^{99m}$Tc tracer. Compared with factor images 142 and 144 (obtained with 4D-FADS), the factor images 132 and 134 (obtained with 5D-GFA) provide better resolution, contrast, accuracy, and overall image quality. In particular, the absence of activity at the location of the $^{99m}$Tc point source in the $^{123}$I primary factor image 132 demonstrates 5D-GFA provides highly effective correction for scatter and cross-talk.

Dynamic Perfusion/Dopamine Transport (DAT) Primate Studies

The performance of the 5D-GFA approach (FIG. 2) was evaluated for simultaneous perfusion/neurotransmission imaging using $^{99m}$Tc-HMPAO and $^{123}$I-altropane in two rhesus monkeys. The primates were injected with five mCi of $^{99m}$Tc-HMPAO and a 30-minute static brain SPECT was acquired 40 minutes later using a CeraSPECT® dedicated brain stationary annular camera (provided by DSI, Waltham, Mass.). Each SPECT study consisted of 120 views over 3600, each view being a 128×128 matrix of pixels of 1.67 mm pixel size. The studies yielded the pure $^{99m}$Tc that would be obtained in a simultaneous dual isotope study with perfect cross-talk correction. Five mCi of $^{123}$I-altropane were injected immediately afterwards and twenty five-minute $^{99m}$Tc/$^{123}$I datasets were acquired. All projections were reconstructed with attenuation (assumed uniform) and variable collimator response modeled in the projector of an OSEM algorithm. The uniform attenuation map was obtained by drawing individual contours of the scalp on each study, and using the "narrow beam geometry" uniform attenuation map ($\mu$=0.15 cm$^{-1}$ for $^{99m}$Tc, and 0.12 cm$^{-1}$ for $^{123}$I). The accuracy of results obtained with 5D-GFA was assessed by computing the bias with respect to sequential imaging (pure $^{99m}$Tc or $^{123}$I alone) using reference cross-talk free images for $^{99m}$Tc that were (1) acquired before injection of $^{123}$I during the initial 30-min $^{99m}$Tc study and (2) scatter-corrected using a Compton window (90-120 keV) subtraction approach. For $^{123}$I factor images, the accuracy of 5D-GFA was assessed by comparing the $^{123}$I factor images acquired during simultaneous dual isotope SPECT to the cross-talk free $^{123}$I factor images obtained during sequential imaging that were (1) estimated by the difference between results obtained from the summed dynamic studies and results obtained from the initial $^{99m}$Tc study and (2) corrected for scatter using a Compton window subtraction approach similar to that used in the case of $^{99m}$Tc alone. In addition to the spectral a priori knowledge used in the pre-/post-synaptic striatal phantom studies described above, a priori knowledge of the time factor associated with $^{99m}$Tc-HMPAO was applied. In particular, this time factor was set to a decaying mono-exponential, because the spatial $^{99m}$Tc-HMPAO distribution (e.g., perfusion) in the primate's brain is constant (except for radioactive decay) 40 minutes post-injection in contrast with the $^{123}$I-altropane activity distribution which is determined by the binding potential that characterizes specific binding of the DAT in the striata as compared to other regions of the brain with non specific uptake.

Figure 9:
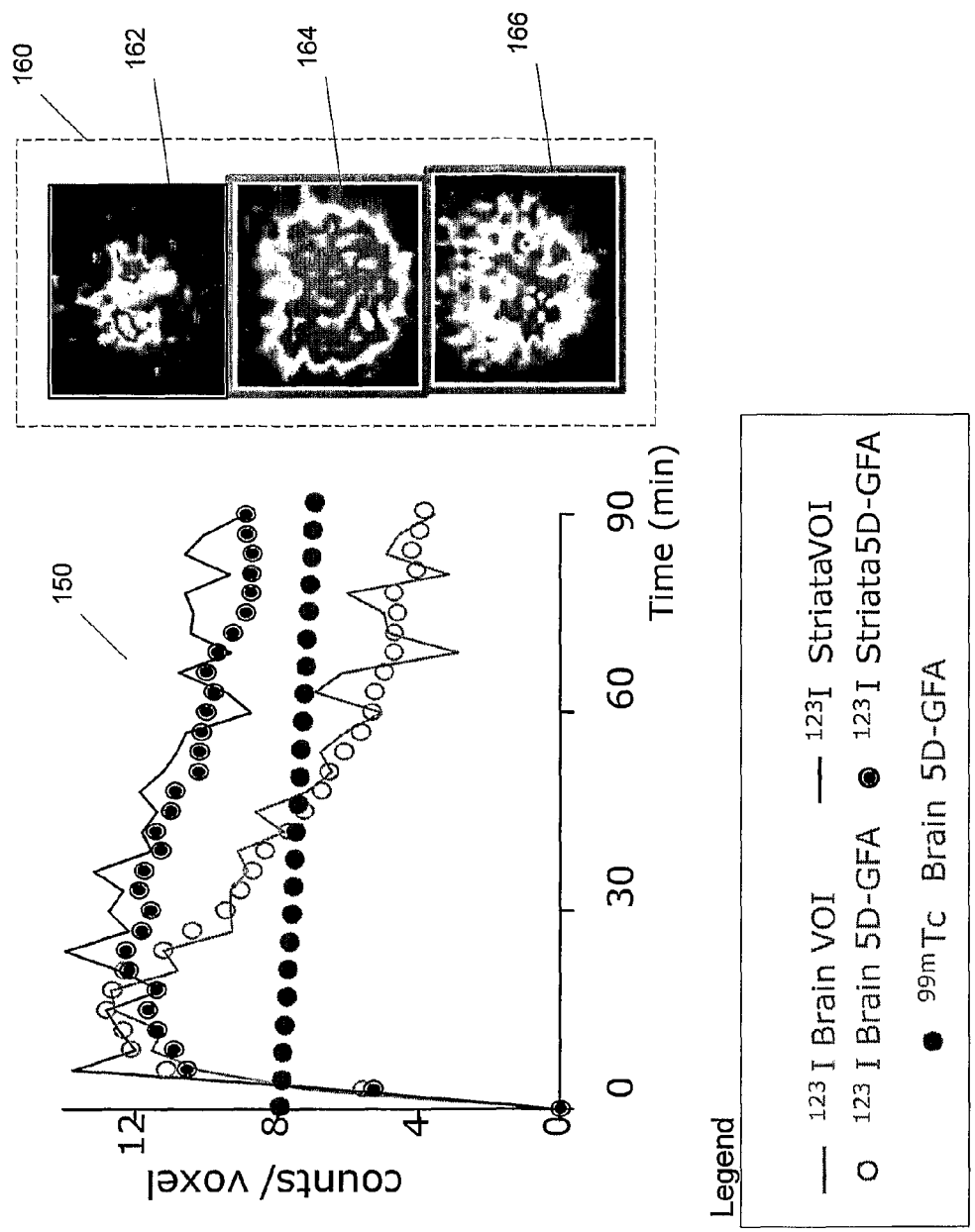
FIG. 9 shows a plot of time factors and sets of image factors obtained in a primate study.

FIG. 9 shows a plot 150 of the estimated dynamic factors obtained with 5D-GFA that correspond to brain perfusion ($^{99m}$Tc-HMPAO) and dopamine transporter distribution in the striata and the rest of the brain ($^{123}$I-altropane) and the corresponding time activity curves associated with volumes of interest drawn over the brain and the striata. FIG. 9 also shows a set of factor images 160 corresponding to the factors obtained with 5D-GFA. The set 160 includes a $^{123}$I striata factor image 162, a $^{99m}$Tc brain factor image 164, and a $^{123}$I brain factor image 166. Biases of $^{99m}$Tc-HMPAO and $^{123}$I-DAT activity estimates were lower with 5D-GFA (9.4±4.3% and 8.7±4.1%, respectively), compared to biases of estimates obtained with VOI (p<0.05), which were greater than 15%. 5D-GFA also yielded lower noise estimates of striatal time factors than did VOI analysis.

Discussion

In the above studies, a priori knowledge about some of the factor curves was included in the minimization process. For example, primary $^{99m}$Tc and $^{123}$I factors were constrained to be Gaussian-shaped functions, centered on 140 and 159 keV, respectively, with a FWHM equal to that of the gamma camera at 140 keV (9.2%) and 159 keV (8.6%). Similar constraints may be set in the time domain with imaging tracers that do not vary over the acquisition time. For example, in approaches that analyze data acquired from simultaneous imaging of perfusion ($^{99m}$Tc-HMPAO) and dopamine transporters ($^{123}$I-altropane), the $^{99m}$Tc time factors may be set to a mono-exponential decaying function with a half-life of 6.02 hours since the distribution of $^{99m}$Tc-HMPAO does not change during imaging. Likewise, in approaches that analyze data acquired from simultaneous imaging of pre-synaptic transporters ($^{99m}$Tc-TRODAT) and post-synaptic receptors ($^{123}$I-IBZM), the $^{123}$I time factors may be set to a mono-exponential decaying function with a half-life of 13 hours. Applying a priori knowledge related to time and energy factors provides a more robust minimization of the objective function in both energy and time dimensions.

Given an initial set of projections and the assumed number of fundamental energy and time factors (e.g., Q=P=4), 5D-GFA provides solutions for the fundamental factor images and the associated fundamental time and energy factors. As discussed earlier, the smaller the ratio of the numbers of Q and P energy and time factors to the number of equations, the greater the likelihood of obtaining a unique solution that is more robust to noise. Although the numbers of fundamental energy factors Q and time factors P is arbitrary, the numbers can be chosen according to some basic considerations. To allow for non-stationary Compton scatter distributions, at least two energy factors associated with scattered $^{99m}$Tc and $^{123}$I photons in addition to the two primary (unscattered) energy factors are chosen. This choice yields scatter spectra that are not pure $^{99m}$Tc and $^{123}$I as discussed below. Hence at least four energy factors ($Q \geq 4$) are typically chosen. In the energy domain, we expect the pre- and post-synaptic tracers to behave differently in the striata and the rest of the brain (specific vs. non specific binding). Therefore, at least four time factors ($P \geq 4$) are typically chosen when performing simultaneous pre-/post-synaptic dopamine imaging in the brain. In some implementations, a choice of three time factors ($P=3$) is sufficient when considering simultaneous perfusion and dopamine pre-synaptic studies if the spatial distribution of the perfusion tracer is stationary after the initial uptake period. In some implementations, when the covariance matrix associated with the OSEM algorithm in the reconstructed images is not exactly known, the 5D-GFA process 40 of FIG. 2 performs a least square minimization without taking into account statistical weighting of the data. In some embodiments, the 5D-GFA process 40 of FIG. 2 is modified to include the use of weighted least-squares algorithms with approximate formulation of the covariance matrix.

Factor analysis approaches that seek to provide unique solutions using physiological information pertaining to the spatial non-overlapping distribution of activity in separate physiological structures (e.g., the myocardium and left and right ventricles) are often not valid in the brain because the same brain structures (e.g., striata) can perform different activities (e.g., pre-synaptic and post-synaptic activities indicated by the uptake of both $^{99m}$Tc-HMPAO and $^{123}$I-altropane). The 5D-GFA process 40 (FIG. 2) constrains primary energy and time factors and factor coefficients using a priori information in both energy and time domains to avoid non-uniqueness artifacts in the solution.

In the studies describe above, the 5D-GFA approach yielded primary estimates of $^{99m}$Tc and $^{123}$I that corresponded to the true known distributions in the striatal phantom, and the expected distributions (e.g., cortex, striata) in the primate studies. However, the estimated scatter factors were not guaranteed to be pure $^{99m}$Tc and $^{123}$I because no constraints were forced on the scatter factors. This had little to no effect on the results of the studies, as the studies were directed to finding the primary distributions of $^{99m}$Tc and $^{123}$I. The robustness of a priori constraints in five-dimensional factor analysis may be further assessed in studies involving simultaneous pre-synaptic transporter and post-synaptic receptor imaging using $^{99m}$Tc-TRODAT and $^{123}$I-IBZM.

A number of embodiments of the invention have been described. Nevertheless, it will be understood that various modifications may be made without departing from the spirit and scope of the invention. For example, methods and systems described above are not restricted to brain imaging and can be used to obtain time factors, energy factors, and factor images of other physiological regions such as the heart and the liver. The 5D-GFA process 40 (FIG. 2) is not limited to SPECT and may be applied to data acquired using other imaging techniques (e.g., MRI) and may be used in any dynamic single or multiple isotope study where spectral and dynamic data are acquired (such as in the case of listmode acquisitions). Furthermore, the steps of 5D-GFA process 40 (FIG. 2) and estimation process 54 (FIG. 3) are not confined to the orders shown, and some of the steps may be repeated or omitted. Accordingly, other embodiments are within the scope of the following claims.

What is claimed is:

1. A method for processing image data, the method comprising:
    representing the image data as a model having a spatial dimension, a time dimension, and an energy dimension, the model including energy factors, time factors, and image coefficients defining spatial distributions of the energy and time factors;
    providing an objective function that is a function of the energy factors, the time factors, and the image coefficients;
    selecting an optimal value for the objective function; and
    using a processor to determine values of the energy factors, the time factors, and the image coefficients that minimize a difference between the optimal value and a value of the objective function, the values of the energy factors, the time factors, and the image coefficients defining a solution.

2. The method of claim 1, further comprising constraining the solution to be unique, and wherein the optimal value for the objective function is a minimum value of the objective function.

3. The method of claim 1, further comprising:
    administering first and second tracers to a subject, the first and second tracers used for monitoring different physiological processes; and
    generating the image data based on detection of radiation emitted by the first and second tracers.

4. The method of claim 1, further comprising:
    constraining the solution according to a priori knowledge associated with some of the energy and time factors.

5. The method of claim 4, wherein constraining the solution comprises modeling primary energy factors as a Gaussian-shaped function centered at a characteristic emission energy of a desired tracer, and having a full-width at half-maximum equal to the product of energy resolution of a camera at the characteristic emission energy, and the characteristic emission energy.

6. The method of claim 1, wherein determining values of the energy factors, the time factors, and the image coefficients comprises:
    calculating a gradient of the objective function; and
    minimizing the gradient iteratively until an absolute value of the gradient is less than a predetermined value.

7. The method of claim 1, wherein providing the objective function comprises including, in the objective function, at least one penalty term that forces a condition on the solution based on a priori information, and wherein determining values of the energy factors, the time factors, and the image coefficients comprises minimizing the penalty term.

8. The method of claim 7, wherein minimizing the penalty term comprises penalizing negative values of the time factors, energy factors, and image coefficients.

9. The method of claim 1 wherein representing the image data as a model comprises:
    selecting at least one of the time factors to be a primary time factor;
    selecting at least one of the time factors to be a scatter time factor;
    selecting at least one of the energy factors to be a primary energy factor; and
    selecting at least one of the energy factors to be a scatter energy factor.

10. A medical imaging system comprising:
a data collection system; and
a data processing system in communication with the data collection system, the data processing system being configured to execute the method of claim 1.

11. The medical imaging system of claim 10, wherein the data collection system comprises at least one of: a SPECT system, an MRI system, a CT system, a PET system, an ultrasound system, and a fluoroscopy system.

12. A storage mechanism having stored thereon, software for processing image data, the software comprising instructions for causing a computer to:
represent the image data as a model having a spatial dimension, a time dimension, and an energy dimension, the model including energy factors, time factors, and image coefficients defining spatial distributions of the energy and time factors;
provide an objective function that is a function of the energy factors, the time factors, and the image coefficients;
select an optimal value for the objective function; and
determine values of the energy factors, the time factors, and the image coefficients that minimize a difference between the optimal value and a value of the objective function, the values of the energy factors, the time factors, and the image coefficients defining a solution.

13. The storage mechanism of claim 12, wherein the software further comprises instructions that cause the computer to constrain the solution to be unique, and wherein the optimal value for the objective function is a minimum value of the objective function.

14. The storage mechanism of claim 12, wherein the software further comprises instructions that cause the computer to receive the image data, wherein the image data is generated from the detection of radiation emitted by first and second tracers administered to a subject, the first and second tracers used for monitoring different physiological processes.

15. The storage mechanism of claim 12, wherein the software further comprises instructions that cause the computer to constrain the solution according to a priori knowledge associated with some of the energy and time factors.

16. The storage mechanism of claim 12, wherein the software further comprises instructions that cause the computer to model primary energy factors as a Gaussian-shaped function centered at a characteristic emission energy of a desired tracer, and having a full-width at half-maximum equal to the product of energy resolution of a camera at the characteristic emission energy, and the characteristic emission energy.

17. The storage mechanism of claim 12, wherein the software further comprises instructions that cause the computer to:
calculate a gradient of the objective function; and
minimize the gradient iteratively until an absolute value of the gradient is less than a predetermined value.

18. The storage mechanism of claim 12, wherein the software further comprises instructions that cause the computer to include, in the objective function, at least one penalty term that forces a condition on the solution based on a priori information.

19. The storage mechanism of claim 18, wherein the software further comprises instructions that cause the computer to penalize negative values of the time factors, energy factors, and image coefficients.

20. The storage mechanism of claim 12, wherein the software further comprises instructions that cause the computer to:
select at least one of the time factors to be a primary time factor;
select at least one of the time factors to be a scatter time factor;
select at least one of the energy factors to be a primary energy factor; and
select at least one of the energy factors to be a scatter energy factor.

* * * * *